(12) United States Patent
Jones et al.

(10) Patent No.: US 12,545,009 B2
(45) Date of Patent: Feb. 10, 2026

(54) PLASTER BOARDS AND METHODS FOR MAKING THEM

(71) Applicant: CertainTeed Gypsum, Inc., Malvern, PA (US)

(72) Inventors: Roger Jones, Patalka, FL (US); Karen Fey, Patalka, FL (US); Mark Bradley, Patalka, FL (US); John Overton, Patalka, FL (US); Arun Thomas, Patalka, FL (US); Anirban Ghosh, Philadelphia, PA (US); James Leedy, Patalka, FL (US)

(73) Assignee: CertainTeed Gypsum, Inc., Malvern, PA (US)

( * ) Notice: Subject to any disclaimer, the term of this patent is extended or adjusted under 35 U.S.C. 154(b) by 0 days.

(21) Appl. No.: 18/090,298

(22) Filed: Dec. 28, 2022

(65) Prior Publication Data

US 2023/0202136 A1     Jun. 29, 2023

Related U.S. Application Data

(60) Provisional application No. 63/294,616, filed on Dec. 29, 2021.

(51) Int. Cl.
    *B32B 7/02*        (2019.01)
    *B28B 19/00*     (2006.01)
    *B32B 13/08*     (2006.01)

(52) U.S. Cl.
    CPC ............ *B32B 7/02* (2013.01); *B28B 19/0092* (2013.01); *B32B 13/08* (2013.01); *B32B 2250/40* (2013.01);

(Continued)

(58) Field of Classification Search
CPC ....... B32B 7/02; B32B 13/08; B32B 2250/40; B32B 2307/722; B32B 2607/00; B28B 19/0092
See application file for complete search history.

(56) References Cited

U.S. PATENT DOCUMENTS

| 2,762,738 A | 9/1956 | Teale |
| 4,279,673 A | 7/1981 | White |

(Continued)

FOREIGN PATENT DOCUMENTS

| CN | 111015929 A | 4/2020 |
| WO | 2008154649 A1 | 12/2008 |

OTHER PUBLICATIONS

International Search Report and Written Opinion in International Pat. App. PCT/US2022/054189, mailed May 1, 2023.

*Primary Examiner* — Alicia J Weydemeyer
*Assistant Examiner* — Laura B Figg
(74) *Attorney, Agent, or Firm* — McDonnell Boehnen Hulbert & Berghoff LLP

(57) ABSTRACT

The present disclosure relates to a plaster board comprising a first panel having an outer surface, an inner surface, a first edge, a second edge, and a center between the first edge and the second edge, a layer of hardened plaster material coupled to the inner surface of the first panel, wherein the hardened plaster material has a first density proximate the first edge of the first panel and a second density proximate the center of the first panel, the first density being greater than the second density, and a second panel having an outer surface, an inner surface, a first edge, a second edge, and a center between the first edge and the second edge, wherein the second panel is coupled to the hardened plaster material opposite the first panel.

20 Claims, 3 Drawing Sheets

(52) U.S. Cl.
CPC ..... *B32B 2307/722* (2013.01); *B32B 2607/00* (2013.01)

(56) References Cited

U.S. PATENT DOCUMENTS

| | | | |
|---|---|---|---|
| 4,354,885 A * | 10/1982 | White | B28B 19/0092 156/39 |
| 5,683,635 A | 11/1997 | Sucech | |
| 10,052,793 B2 | 8/2018 | Li | |
| 11,186,067 B2 | 11/2021 | Li | |
| 2006/0280932 A1 | 12/2006 | Kimura | |
| 2010/0307657 A1 | 12/2010 | Diaz | |
| 2014/0273687 A1 | 9/2014 | Garvey | |
| 2016/0376191 A1* | 12/2016 | Li | B32B 13/02 |
| 2020/0055278 A1 | 2/2020 | Li | |

* cited by examiner

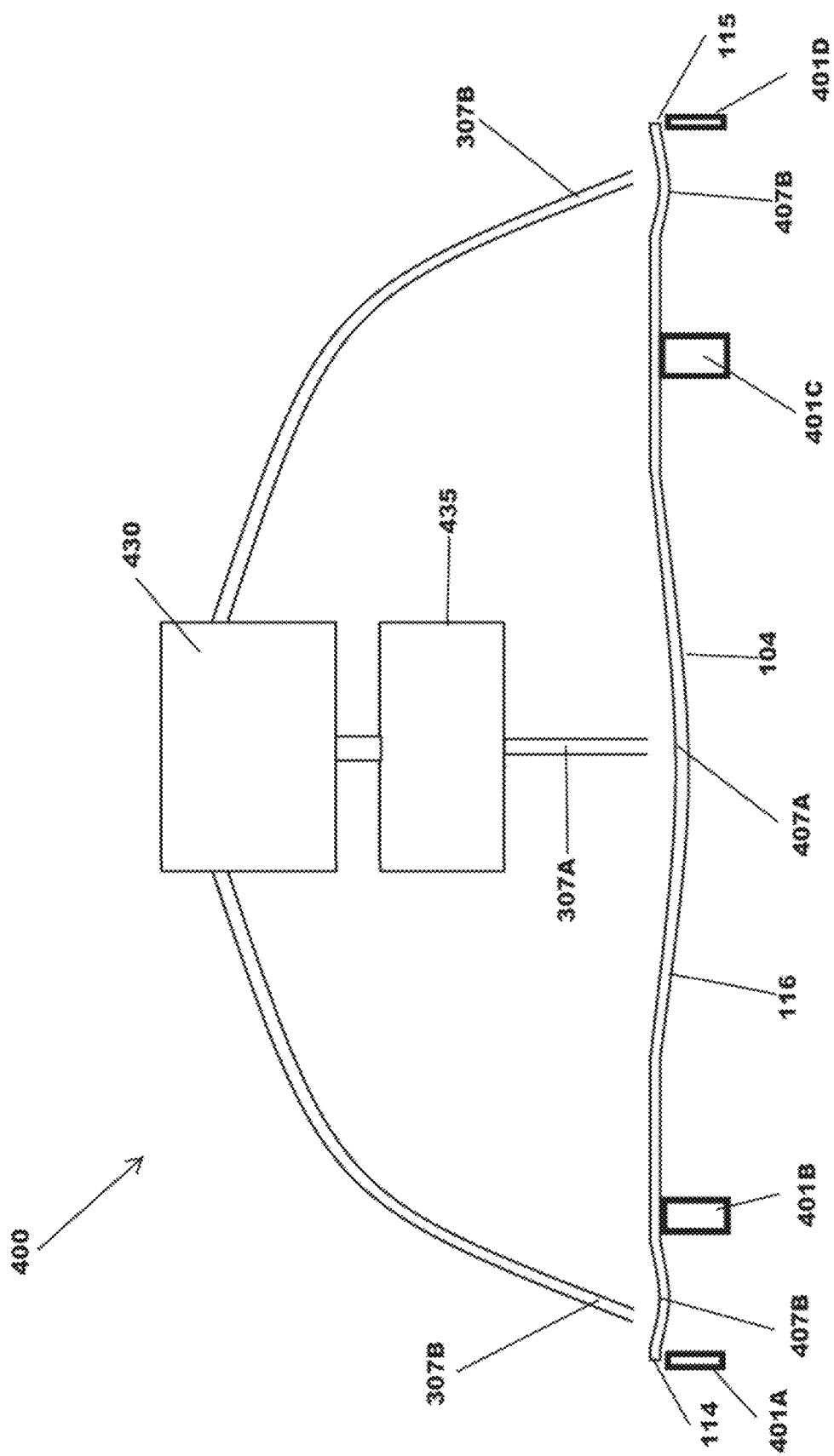

PLASTER BOARDS AND METHODS FOR MAKING THEM

CROSS-REFERENCE TO RELATED APPLICATIONS

This application claims the benefit of priority of U.S. Provisional Patent Application No. 63/294,616, filed Dec. 29, 2021, which is hereby incorporated herein by reference in its entirety.

BACKGROUND OF THE DISCLOSURE

1. Field of the Disclosure

The present disclosure relates generally to plaster boards and methods for making plaster boards. The present disclosure relates more particularly to plaster boards having higher density portions disposed proximate the edges thereof.

2. Technical Background

Plaster boards, often called "sheet rock" or "drywall", are typically used to construct walls within homes, businesses, or other buildings. Plaster boards are very often made of gypsum, but other materials, including lime and cement, are also used. A typical method for making a plaster board involves dispensing and spreading a plaster material (e.g., a slurry of gypsum in water) onto a paper sheet or fiberglass mat on a platform, and covering the plaster material with another paper sheet or fiberglass mat. This sandwiched structure is fed through rollers to provide a structure of a desired thickness, then allowed to cure to form a hardened plaster material disposed between the two sheets of paper or fiberglass. The plaster board may be cut into sections having predetermined lengths and widths that conform to accepted construction standards.

Various methods are used to reduce the weight of the plaster boards by reducing the density of the plaster material. One such method is foaming, in which air bubbles are introduced into the wet slurry prior to application to the paper sheet of fiberglass mat. However, reducing the density of the plaster material can result in a weaker plaster board.

In some methods, a first high density skim coat of slurry is applied to the paper sheet of fiberglass mat. A second main layer of lower density slurry is applied on top of the skim coat. The skim coat provides increased strength, and specifically higher nail pull, compared to a plaster board made entirely of the low density plaster material. However, the addition of the skim coat increases the weight of the plaster board. Furthermore, during application of the main layer of slurry, the wet skim coat can be pushed out of position. This bootwash or washout of the skim coat can result in an uneven nail pull rating for the plaster board.

Accordingly, what are needed are improved plaster boards having both sufficient strength and reduced weight. What is also needed are improved methods and processes for making such plaster boards.

SUMMARY OF THE DISCLOSURE

One aspect of the disclosure is a plaster board comprising:
a first panel having an outer surface, an inner surface, a first edge, a second edge, and a center between the first edge and the second edge;
a layer of hardened plaster material coupled to the inner surface of the first panel, wherein the hardened plaster material has a first density proximate the first edge of the first panel and a second density proximate the center of the first panel, the first density being greater than the second density; and
a second panel having an outer surface, an inner surface, a first edge, a second edge, and a center between the first edge and the second edge, wherein the second panel is coupled to the hardened plaster material opposite the first panel.

Another aspect of the disclosure is a method of manufacturing a plaster board, the method comprising:
unrolling a first panel material from a first roll;
applying a first plaster slurry line to a top surface of the first panel material proximate a first edge of the first panel material;
applying a second plaster slurry line to the top surface of the first panel material proximate a second edge of the first panel material;
applying a third plaster slurry line to the top surface of the first panel material between the first plaster slurry line and the second plaster slurry line, wherein the third plaster slurry line has a lower density than the first plaster slurry line; and applying a second panel material to a top surface of third plaster slurry line.

Additional aspects of the disclosure will be evident from the disclosure herein.

BRIEF DESCRIPTION OF THE DRAWINGS

The accompanying drawings are included to provide a further understanding of the methods and devices of the disclosure, and are incorporated in and constitute a part of this specification. The drawings are not necessarily to scale, and sizes of various elements may be distorted for clarity. The drawings illustrate one or more embodiment(s) of the disclosure and together with the description serve to explain the principles and operation of the disclosure.

FIG. 4 illustrates a method of manufacturing a plaster board according to one embodiment of the disclosure.

DETAILED DESCRIPTION

The present inventors have noted disadvantages of existing processes for forming plaster boards having a plaster material with a varying density disposed therein. Conventional plaster boards are formed between sheets of paper or fiberglass mat. A slurry of plaster material is applied to the inner surface of a first sheet. One or more rollers are used to smooth the applied slurry into a uniform thickness. The second sheet of paper or fiberglass is then applied to the top of the slurry, thus sandwiching the slurry between the two sheets. However, the slurry, and therefore the resulting board, has a generally uniform density and strength along the surface of the first sheet. In order for the board to have sufficient strength in areas requiring high nail pull, such as proximate the edges of the board, the overall strength of the plaster material is higher than is necessary for other locations, such as proximate the center of the board.

Accordingly, one aspect of the disclosure is a plaster board having a first surface and an opposed second surface. The plaster board includes a body of hardened plaster material extending from the first surface of the plaster board to the second surface of the plaster board. The hardened plaster material has a first density proximate a first edge of the plaster board and a second density proximate the center of the plaster board, wherein the first density is higher than the second density. The hardened plaster material further has a third density proximate the second edge of the plaster board, wherein the third density is substantially similar to the first density. At the center of the board, the density of the hardened plaster material is substantially similar along the thickness of the board. As will be described in more detail below, such a plaster board can be produced by applying two streams of higher density slurry proximate respective edges of the first sheet of paper and a stream of lower density slurry proximate the center of the first sheet of paper.

Figure 1:
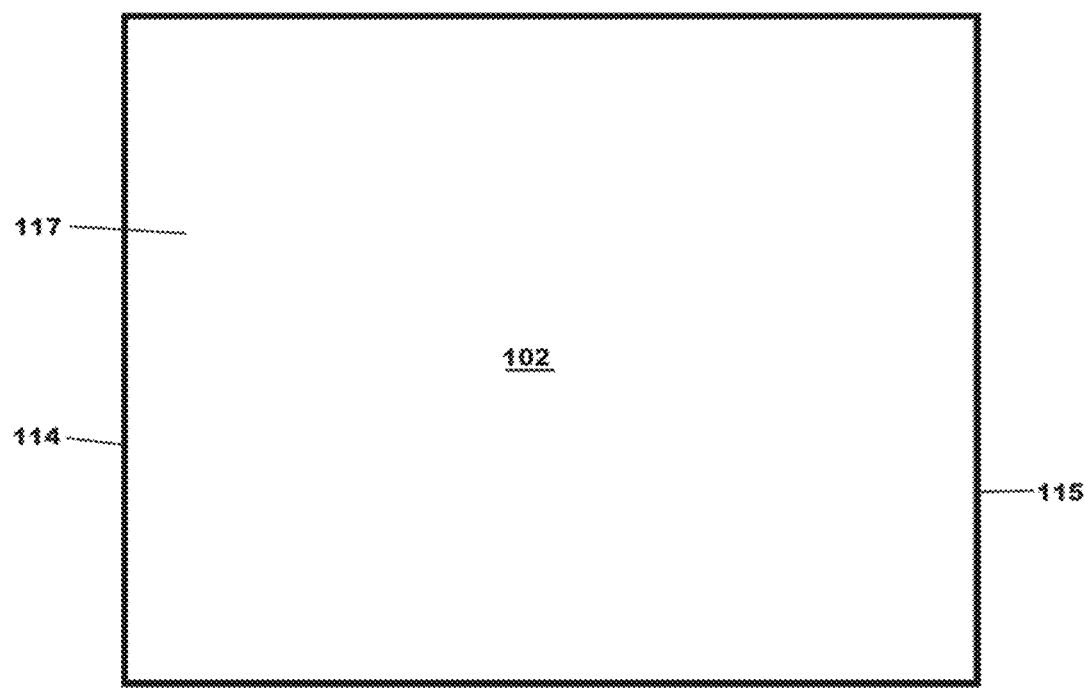
FIG. 1 is a top perspective view of a plaster board according to one embodiment of the disclosure.
Figure 2:
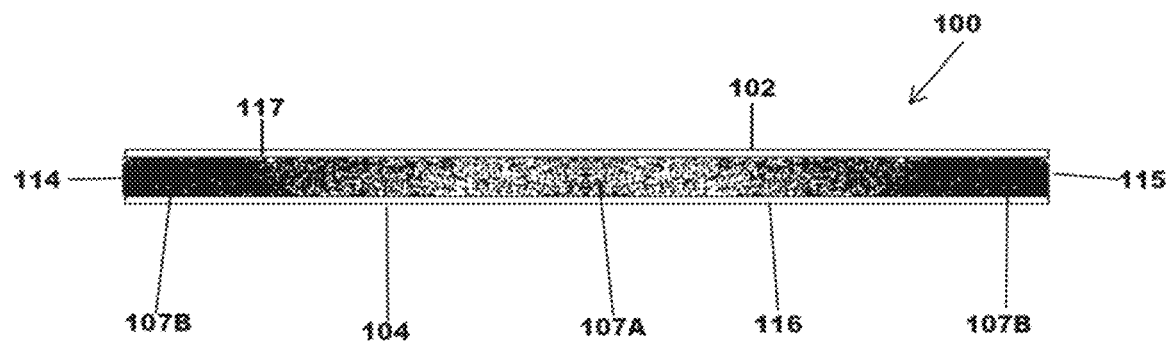
FIG. 2 is cross-section view of the plaster board of FIG. 1.

One embodiment of such a plaster board is described with respect to FIGS. 1-2, which shows two views of a plaster board 100. The FIG. 1 is an x-y plane view of the plaster board 100. The FIG. 2 is an x-z plane view of the plaster board 100. The plaster board 100 includes opposing surfaces 102 and 104, a body of hardened plaster material 106 (including a lower density portion hardened plaster material 107A and two higher density portions of hardened plaster material 107B). As shown in FIG. 2, there are not clear boundaries between the lower density hardened plaster material 107A and the higher density hardened plaster material 107B. Instead, the two plaster materials are partially mixed in a transition phase forming a density gradient between the higher density hardened plaster material 107B and the lower density hardened plaster material 107A.

The body of hardened plaster material 106 extends from the surface 102 to the surface 104 on opposite sides of the plaster board 100. The hardened plaster material 106 also extends from the first edge 114 to the second edge of 115 of the plaster board 100. At any given point in the x-y plane, the density of the hardened plaster material 106 is substantially similar along the z direction (through the thickness of the plaster board 100).

As the person of ordinary skill in the art will appreciate, the plaster boards described herein may be made using a variety of different inorganic base materials. For example, in various embodiments of the plaster boards and methods as otherwise described herein, the plaster material comprises a base material that is a gypsum material. In other embodiments of the plaster boards and methods as otherwise described herein, the plaster material comprises a base material that is, for example, lime or cement. The hardened plaster material may include one or more fillers or additives in the base plaster material(s), e.g., fiberglass, a plasticizer material, a foaming agent, and/or ethylenediaminetetraacetic acid (EDTA). In some embodiments, additional materials are dispersed within the plaster material. For example, a layer a damping material may be included within the plaster material 106. Statements regarding the density of the plaster material 106 do not necessarily apply to additional layers of material therein.

The plaster boards of the present disclosure may be made in a variety of thicknesses. The person of ordinary skill in the art will select a desirable thickness for a particular end use. In various embodiments of the plaster boards and methods as otherwise described herein, the total thickness of the plaster board (i.e., along the z-axis between the surfaces 102 and 104 of FIG. 1) is at least 0.25 inches and no more than 2 inches, e.g., in the range of 0.30 inches to 1.25 inch. or in the range of 0.5 inch to 1 inch. In various particular embodiments, the total thickness of the plaster board is substantially equal to 0.375 inches. In other particular embodiments, the total thickness of the plaster board is substantially equal to 0.5 inches. In still other particular embodiments, the total thickness of the plaster board is substantially equal to 0.625 inches. And in still other particular embodiments, the total thickness of the plaster board is substantially equal to one inch (e.g., especially when lower density plaster materials are used).

The hardened plaster material 106 is positioned between two sheets or panels, a front panel 116 and a back panel 117. As the person of ordinary skill in the art will appreciate, a length of paper, fiberglass mat or fabric, or other backing material form the front panel 116 and the back panel 117. During manufacturing, one of the front panel 116 or the back panel 117 may be disposed platform, such that the wet plaster material is dispensed on and spread onto the backing material. In such embodiments, the paper, fiberglass or other backing material will remain at the surfaces of the plaster board, as is conventional for wallboard materials.

As noted above, the use of foaming or additives within the plaster material can help to improve a number of properties of the plaster board. This can be used to create a plaster material having a relatively low density resulting in a plaster board that is light and therefore desirable for an installer. However, this low density plaster material can have relatively worse properties as compared to higher density materials. But the use of a hardened plaster material having a varied density along the width of the plaster board can improve such properties (e.g., nail pull). In various embodiments, the hardened plaster material has a density in the range of 0.40-0.65 g/cm$^3$.

Based on the disclosure herein, the person of ordinary skill in the art will provide a first density (i.e., proximate the first edge of the first panel) that is greater than a second density (proximate the center of the first panel) by a substantial amount, in order to enjoy various benefits as described herein. For example, in various embodiments as otherwise described herein, the first density is at least 110% of the second density, e.g., at least 120% of the second density. In various embodiments as otherwise described herein, the first density is at least 130% of the second density, e.g., at least 140% of the second density. In various such embodiments, the first density is no more than 300% of the second density, e.g., no more than 200% of the first density. For example, in various embodiments, the first density is in the range of 110%-300% of the second density, e.g., in the range of 120%-300%, or 130%-300%, or 140%-300%, or 150%-300%, or 110%-200%, or 120%-200%, or 130%-200%, or 140/6-200%, or 150%-200% of the second density.

The person of ordinary skill in the art will appreciate, however, that the presently disclosed methods and boards can be of a variety of thicknesses and weights. However, the weights of the plaster boards described herein are generally lighter than traditional plaster boards of the same dimension and having comparable strength. For example, the board can be ⅜" in thickness with a dry weight below 1400 lb/MSF (MSF=1,000 square feet). In other examples, the board can be ⅜" in thickness with a dry weight below 1350 lb/MSF. A person of ordinary skill will appreciate that the weight of the plaster board increases with the thickness of the plaster board. In some embodiments, the board has a dry weight of less than 467 lb/MSF per ⅛" of thickness. In some examples, the board has a dry weight of less than 450 lb/MSF per ⅛" of thickness.

Figure 3:
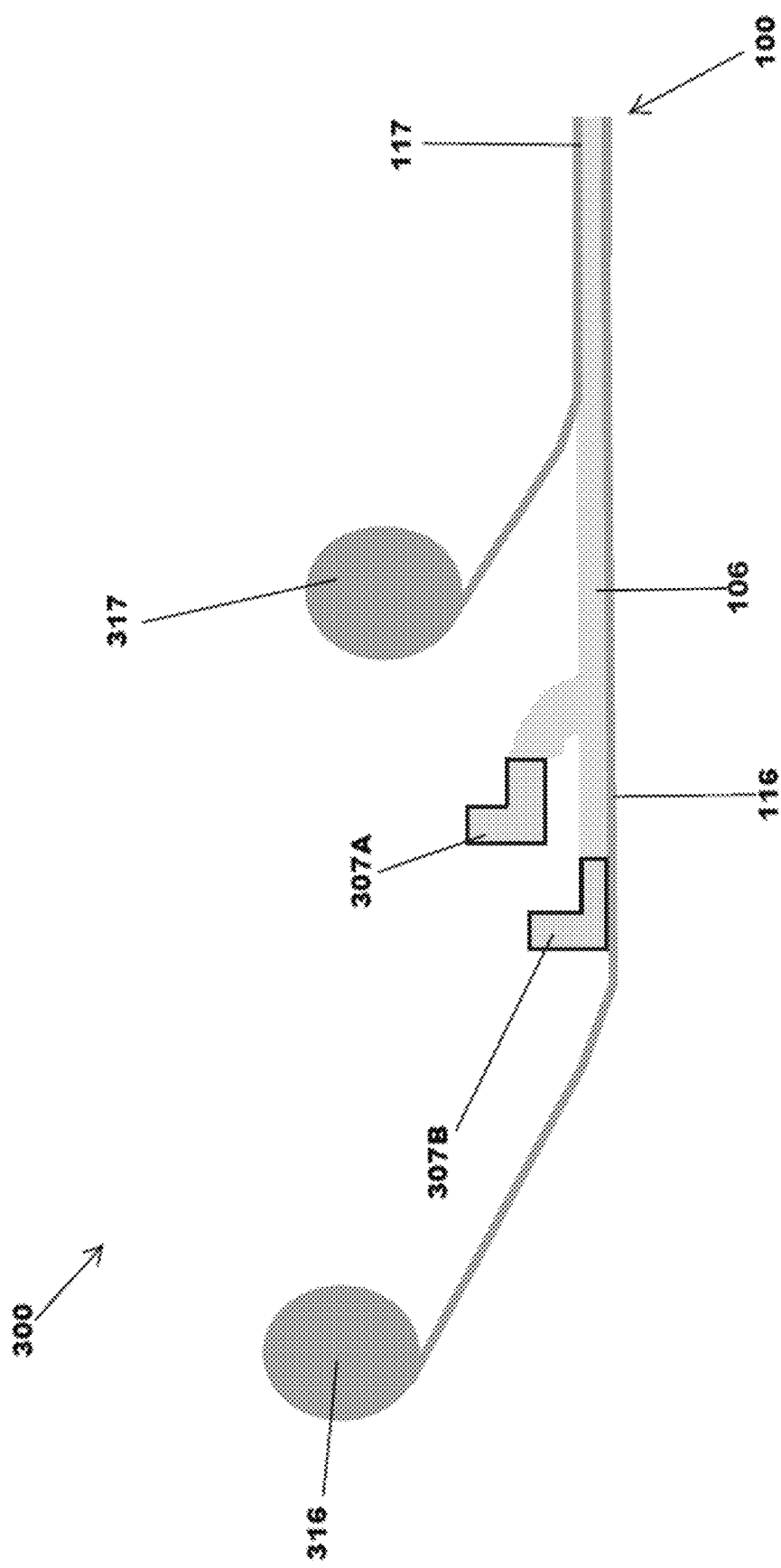
FIG. 3 illustrates a method of manufacturing a plaster board according to one embodiment of the disclosure.

FIG. 3 illustrates a simplified manufacturing system 300 for producing a plaster board 100. The manufacturing system 300 includes a roll 316 of front panel material 116, a roll 317 of back panel material 117, and slurry applicators 307A, 307B. In some applications, the manufacturing system 300 further includes one or more adhesive applicators to apply adhesive between layers of the plaster board to bind the plaster material 106 to front and/or back panels 116, 117.

During production, the front panel 116 is unrolled from the roll 316 with the outer surface 104 facing down, so as to form a bottom layer of the laminate. The one or more applicators 307B apply edge layers of a plaster material slurry 306B, such as stucco slurry, to the inner surface of the front panel 116. The plaster material slurry 306B is a relatively high density plaster material slurry, or a plaster material slurry with a relatively low foam content. As used herein, the "density" of a plaster slurry material is not the density of the slurry itself, but rather the density of the material that the slurry sets into in the final set and dried board. The one or more applicators 307B apply a line of the plaster material slurry 306B to each edge (in the x direction as shown in FIGS. 1-2) of the front panel 116. In some embodiments, the one or more applicators 307B include two applicators 307B, each applying a line of plaster slurry material 306B proximate a respective edge of the front panel 116. In alternative embodiments, the one or more applicators 307B include a single applicator with two or more nozzles, with at least one nozzle positioned to apply a line of plaster material slurry 306B proximate a respective edge of the front panel 116. In some examples, additional equipment is positioned in line after the applicator(s) 307B to smooth the slurry 306B into a layer having a uniform thickness.

One or more applicators 307A apply a plaster material slurry 307A to the top surface of the front panel 116 in between the two lines of plaster material slurry 307B. The system 300 may include a smoothing device inline after the second applicator 307A for smoothing the plaster material slurry 307A into a uniform layer. In some examples, a single smoothing device is positioned inline after the second applicator 307A and is used to smooth both plaster material slurries 307A and 307B. In alternative forms, a first smoothing device or devices is used to smooth the plaster material slurry 307B prior to application of the plaster material slurry 307A. A second smoothing device is then used to smooth the plaster material slurry 307A.

In some examples, the second applicator 307A applies the plaster material slurry 307A before the plaster material slurry 307B dries. Accordingly, the plaster material slurries 307A and 307B partially mix proximate the inside edges of the two lines of plaster material slurry 307B so as to form a transition area between the plaster material slurry 307B and the plaster material slurry 307A.

Alternatively or additionally a component is added to one or both plaster material slurries 307A and 307B to aid in bonding therebetween and/or between the plaster material slurries 307A and 307B and the front and back panels 116 and 117. In some forms, the bonding material comprises dextrose (e.g., in an amount of 1-3 lbs/MSF). The addition of the bonding material, such as dextrose, increases the speed at which the materials bond, and therefore allows for the plaster material slurries 307A and 307B to be dried faster, reducing the manufacturing time of the plaster board 100.

The back panel 117 is unrolled from the roll 317 and applied to the top surface of the plaster material slurries 307A and 307B to form the plaster board 100. While the embodiment shown in FIG. 3 has the front panel 116 forming the bottom of the laminate, it is understood that the rolls 316 and 317 could be switched such that the bottom layer is form by the back panel 117.

FIG. 4 illustrates a simplified manufacturing system 400 for manufacturing a plaster board, such as the plaster board 100 described above. FIG. 4 is an end view of the manufacturing system 400, showing a cross section of the front panel 116 near the location of the applicators 307A and 307B. In some forms, the manufacturing system 400 is the same as the manufacturing system 300 described above.

The manufacturing system 400 includes two or more nozzles or applicators 307B for applying a plaster material slurry proximate the edges 114 and 115 of the front panel 116. The manufacturing system 400 further includes an applicator 307B positioned to apply a plaster material slurry proximate the center, i.e. halfway between the edges 114 and 115, of the front panel 116. While the applicators 307A and 307B appear to be positioned at the same point along the length of the front panel 116, it is understood that the applicator 307A can be positioned downstream of the applicators 307B, as shown in FIG. 3. Alternatively, the applicator 307A can be positioned upstream of the applicators 307B.

A series of guides or roller 401A-D contact the front panel 116 so as to form concave sections, such as channels or grooves, therein. In the shown embodiment, a first guide 401A is positioned proximate the first edge 114 of the front panel 116. The first guide 401A presses upward on the bottom surface 104 of the front panel 116. A second guide 401B is positioned between the first edge 114 and the center of the front panel 116. The second guide 401B also pushes upwards on the bottom surface 104 of the front panel 116. The first two guides 401A and 401B form an edge channel 407B therebetween. An applicator 307B is positioned above the edge channel 407B so as to apply a plaster material slurry into the edge channel 407B.

Similarly, a fourth guide 401D is positioned proximate the second edge 115 of the front panel 116. The fourth guide 401D presses upward on the bottom surface 104 of the front panel 116. A third guide 401C is positioned between the second edge 115 and the center of the front panel 116. The third guide 401C also pushes upwards on the bottom surface 104 of the front panel 116. These two guides 401C and 401D form an edge channel 407B therebetween. An applicator 307B is positioned above the edge channel 407B so as to apply a plaster material slurry into the edge channel 407B.

In some embodiments, the second guide 401B and the third guide 401C form a center channel 407A therebetween. The applicator 307A applies a plaster material slurry into the center channel 407A. In some embodiments, one or more additional rollers or guides are positioned between each of the second and third guides 401B and 401C and the center of the front panel 116. These additional rollers or guides are what form the center channel 407A.

Alternatively or additionally, guides or rollers can be positioned to press downward on the top surface or inner surface of the front panel 116. The guides or rollers are positioned proximate the center of the channels 407A and 407B and are used to form said channels 407A and 407B.

In some embodiments, the guides 401A-D each comprise one or more rollers configured to contact the surface of the front panel 116. The rollers 401A-D spin from the friction between the rollers 401A-D and the front panel 116 as the front panel moves along the manufacturing system 400, thus reducing wear on the front panel 116. In other embodiments, the guides 401A-D comprise static guides. Static guides 401A-D may include one or more fingers contacting the front panel 116 at specific points within the manufacturing system 400. In some forms, the static guides are resilient and configured to deform or bend from contact with the front panel 116. Alternatively, the static guides 401A-D include elongated guides, such as walls or rails, that extend along a length of the manufacturing system 400. The length of the manufacturing system 400 having the elongated static guides 401A-D includes one or more applicators 307A and/or 307B.

In some embodiments, the manufacturing system 400 includes one or more additional rollers or guides positioned downstream of the guides 401A-D. The additional rollers or guides contact a relatively wide portion of the bottom surface 104 of the front panel 116 proximate one of more of the channels 407A and/or 407B. The rollers or guides flatten the front panel 116, removing the channel 407A and/or 407B. In some forms, the flattening roller or guide is positioned opposite roller positioned above the front panel 116 for smoothing the plaster material slurry. As such, the pressing of the plaster material slurry and front panel between the guides or rollers causes the front panel 116 and slurry assembly to have a uniform thickness.

In some forms, the plaster material slurries are applied and smoothed in stages. In these examples, a first set of guides 401A-D form the edge channels 407B. The applicators 307B apply a plaster material slurry into the edge channels 407B. Downstream of the applicators 307B, one or more flattening guides or rollers and one or more smoothing rollers remove the channel 307B and smooth the plaster material slurry near the edges 114 and 115 of the front panel.

Downstream further, additional guides, such as the guides 401B-C form the center channel 407A. The applicator 307A applies a plaster material slurry into the center channel 407A. Downstream from the applicator 307A, a flattening roller or guide and a smoothing roller remove the center channel 407A and smooth the plaster material slurry.

The applicators 307B and the applicator 307A are configured to apply different plaster material slurries to the front panel 116. Specifically, the applicators 307B are configured to apply a relatively high density plaster material slurry and the applicator 307A is configured to apply a relatively low density plaster material slurry.

The manufacturing system 400 includes a slurry mixer 430. The slurry mixer 430 is configured to agitate the wet and dry components of the plaster material to form a relatively uniform slurry. In some forms, the slurry mixer 430 includes one or more inlets through which the components of the plaster material are added. The one or more inlets are computer controlled such that the formula of the plaster material can be adjusted electronically. For example, the slurry mixer 430 includes an adjustable water inlet. The water inlet can be adjusted to change the moisture content of the plaster material slurry.

The slurry mixer 430 includes one or more outlets going to the applicators 307B. The applicators 307B apply the slurry mixture from the slurry mixer to the front panel 116 as described above. The slurry mixer 430 includes an additional outlet leading to a foaming chamber 435. The foaming chamber 435 is used to reduce the density of the slurry mixture. In some forms, the foaming chamber 435 includes an inlet through which an aqueous foam is added to the slurry mixture. Mixing the aqueous foam and the slurry mixture forms a foamed slurry mixture having a lower density than the unfoamed slurry mixture applied by the applicators 407B. Alternatively or additionally, the foaming chamber 435 includes an aerator. The aerator introduces gas, such as ambient air, into the slurry mixture such that bubbles form therein thus foaming the slurry mixture.

The foaming chamber 435 is operably coupled to the applicator 307A. The applicator 307A applies the foamed slurry mixture from the foaming chamber to the front panel 116.

In some embodiments, the manufacturing system 400 includes multiple slurry mixers 430. A first slurry mixer 430 is used to mix a slurry for use by the applicator 307A. A second slurry mixer 430 is used to mix the slurry for use by the applicators 307B. Accordingly, different slurry mixtures can be used for the center portion of the plaster material and the edge portions of the plaster material. The use of separate mixtures allows for further variance between the two plaster material slurries.

The plaster material slurry mixtures have a number of components and properties that can be adjusted. As discussed above, the use of at least two different plaster material slurries allows for the use of a lower density plaster material slurry near the center of the plaster board 100. The process also allows for the use of lower moisture slurries when compared to previous plaster board manufacturing processes. The use of lower moisture slurries allows for faster drying of the plaster material slurries and therefore a shorter manufacturing time for the plaster boards 100.

In some examples, the plaster material slurries have an average moisture content of less than 25%. In some forms, the plaster material slurries have an average moisture content of less than 20%. In some forms, the plaster material slurries have an average moisture content of less than 15%. In some forms, the plaster material slurries have an average moisture content of less than 10%. In some forms, the plaster material slurries have an average moisture content of between 5% and 15%. In some forms, the plaster material slurries have an average moisture content of between 5% and 10%. The moisture content of the plaster material slurries may differ between the edges and the center of the plaster board 100. In some examples, the plaster board has a moisture content of less than 10% proximate the edges and greater than 10% proximate the center.

The plaster material slurries include a soap to aid in foaming. In some forms, the plaster material slurries having a soap content between 0.2% and 0.5%. In some forms, the plaster material slurries having a soap content between 0.25% and 0.45%. In some forms, the plaster material slurries having a soap content between 0.25% and 0.35%.

In some examples, the lower density plaster material slurry has a foam density above 70 g/l. In some examples, the lower density plaster material slurry has a foam density above 75 g/l. In some examples, the lower density plaster material slurry has a foam density between 80 g/l and 90 g/l.

The composition of the plaster material slurries enables the manufacturing system to apply slurry to the front panel 116 at a faster rate than previous manufacturing systems. In some forms, the manufacturing system applies slurry to a front panel moving 116 moving at above 150 fpm. In some forms, the manufacturing system applies slurry to a front panel moving 116 moving at above 175 fpm. In some forms, the manufacturing system applies slurry to a front panel moving 116 moving at above 180 fpm. In some forms, the manufacturing system applies slurry to a front panel moving 116 moving between 180 fpm and 200 fpm.

As noted above, the first plaster slurry line (which provides material at a first edge of the plasterboard) has a higher density than the third plaster slurry line (which provides material at a central region of the plasterboard). For example, in various embodiments, the density of the first plaster slurry line is at least 120% of the density of the third plaster slurry line, e.g., at least 130%. In various embodiments, the density of the first plaster slurry line is at least 140% of the density of the third plaster slurry line, e.g., at least 150%. However, in various embodiments, the density of the first plaster slurry line is no more than 300% of the density of the third plaster slurry line, e.g., no more than 225% or no more than 200%. For example, in various embodiments, the density of the first plaster slurry line is in the range of 120%-300% of the density of the third plaster slurry line, e.g., in the range of 130%-300%, or 140%-300%, or 150%-300%, or 120%-225%, or 130%-225%, or 140%-225%, or 150%-225%, or 120%-200%, or 130%-200%, or 140%-200%, or 150%-200% of the density of the third plaster slurry line.

Similarly, in various embodiments, the second plaster slurry line (which provides material at a second edge of the plasterboard) has a higher density than the third plaster slurry line (which provides material at a central region of the plasterboard). For example, in various embodiments, the density of the second plaster slurry line is at least 120% of the density of the third plaster slurry line, e.g., at least 130%. In various embodiments, the density of the second plaster slurry line is at least 140% of the density of the third plaster slurry line, e.g., at least 150%. However, in various embodiments, the density of the second plaster slurry line is no more than 300% of the density of the third plaster slurry line, e.g., no more than 225% or no more than 200%. For example, in various embodiments, the density of the second plaster slurry line is in the range of 120%-300% of the density of the third plaster slurry line, e.g., in the range of 130%-300%, or 140%-300%, or 150%-300%, or 120%-225%, or 130%-225%, or 140%-225%, or 150%/6-225%, or 120/6-200%, or 130%-200%, or 140%-200%, or 150/6-200% of the density of the third plaster slurry line.

The present inventors have determined that the use of denser plasterboard edges can improve nail pull force, i.e., for nails driven through the plasterboard at edges thereof. In some examples, the plaster board 100 has a nail pull of at least 50 lbf for a nail driven proximate the first edge (i.e., in the region of the first density). In some examples, the plaster board 100 has a nail pull of at least 70 lbf. In some examples, the plaster board 100 has a nail pull of at least 75 lbf.

The present inventors have also determined that the edge hardness is advantageously improved though the use of denser materials at edges of the board as described herein.

Moreover, the present inventors have determined that the use of denser materials at edges of the board as described herein can provide for a lower dryer heat load (e.g., lower overall energy expenditure in drying).

"MSF" means 1000 square feet. The person of ordinary skill in the art will calculate equivalent areas in square meters by using the conversion
  1000 ft$^2$=92.903 m$^2$.

"lb" is an abbreviation for pounds, and refers to U.S. pounds. The person of ordinary skill in the art will calculate equivalent masses in grams by using the conversion
  1 lb=453.59 g.

The person of ordinary skill in the art will convert between inches (") and centimeters by using the conversion
  1"=2.54 cm.

"lbf" is an abbreviation for pounds force. The person of ordinary skill in the art will calculate equivalent forces in Newtons using the conversion
  1 lbf=4.4482 N.

Various aspects and embodiments of the disclosure are provided by the following enumerated embodiments, which may be combined in any number and in any combination not logically or technically inconsistent.

Embodiment 1. A plaster board comprising:
  a first panel having an outer surface, an inner surface, a first edge, a second edge, and a center between the first edge and the second edge;
  a layer of hardened plaster material coupled to the inner surface of the first panel, wherein the hardened plaster material has a first density proximate the first edge of the first panel and a second density proximate the center of the first panel, the first density being greater than the second density; and
  a second panel having an outer surface, an inner surface, a first edge, a second edge, and a center between the first edge and the second edge, wherein the second panel is coupled to the hardened plaster material opposite the first panel.

Embodiment 2. The plaster board of embodiment 1 wherein hardened plaster material has a third density proximate the second edge of the first panel, the third density being substantially similar to the first density.

Embodiment 3. The plaster board of any of embodiments 1-2 wherein the hardened plaster material has a density substantially equal to the second density proximate the center of the first panel proximate the center of the second panel, and halfway between the center of the first panel and the center of the second panel.

Embodiment 4. The plaster board of any of embodiments 1-3 wherein the plaster board has a dry weight of less than 467 lb/MSF per ⅛" of thickness.

Embodiment 5. The plaster board any of embodiments 1-4 wherein the plaster board has a dry weight of less than 450 lb/MSF per ⅛" of thickness.

Embodiment 6. The plaster board of any of embodiments 1-5 wherein the hardened plaster material includes dextrose.

Embodiment 7. The plaster board of any of embodiments 1-6 wherein the plaster board has a nail pull of at least 70 lbf.

Embodiment 8. The plaster board of any of embodiments 1-7 wherein the plaster board has a nail pull of at least 75 lbf.

Embodiment 9. The plaster board of any of embodiments 1-8, wherein the first density is at least 110% of the second density, e.g., at least 120% of the second density.

Embodiment 10. The plaster board of any of embodiments 1-8, wherein the first density is at least 130% of the second density, e.g., at least 140% of the second density.

Embodiment 11. The plaster board of any of embodiments 1-10, wherein the first density is no more than 300% of the second density, e.g., no more than 200% of the second density.

Embodiment 12. The plaster board of any of embodiments 1-8, wherein the first density is in the range of 110%-300% of the second density, e.g., in the range of 120%-300%, or 130%-300%, or 140%-300%, or 150%-300%, or 110%-200%, or 120%-200%, or 130%-200%, or 140%-200% or 150%-200% of the second density.

Embodiment 13. A method of manufacturing a plaster board, the method comprising:
  providing a first panel material (e.g., by unrolling it from a first roll);
  applying a first plaster slurry line to a top surface of the first panel material proximate a first edge of the first panel material;

applying a second plaster slurry line to the top surface of the first panel material proximate a second edge of the first panel material;

applying a third plaster slurry line to the top surface of the first panel material between the first plaster slurry line and the second plaster slurry line, wherein the third plaster slurry line has a lower density than the first plaster slurry line; and applying a second panel material to a top surface of third plaster slurry line.

Embodiment 14. The method of embodiment 13 further comprising bending the first panel material to form a first edge channel proximate the first edge of the first panel material, wherein applying the first plaster slurry line comprises applying the first plaster slurry line into the first edge channel.

Embodiment 15. The method of any of embodiments 13-14 further comprising bending the first panel material to form a center channel between the first edge and the second edge of the first panel material, wherein applying the third plaster slurry line comprises applying the third plaster slurry line into the center channel.

Embodiment 16. The method of any of embodiments 13-15 further comprising foaming a slurry mixture to form a foamed slurry mixture, wherein applying the third plaster slurry line comprises applying the foamed slurry mixture.

Embodiment 17. The method of embodiment 16 wherein applying the first plaster slurry line comprises applying the slurry mixture prior to foaming.

Embodiment 18. The method of any of embodiments 13-17 wherein the third plaster slurry line comprises a soap content of between 0.25% and 0.35%.

Embodiment 19. The method of any of embodiments 13-18 wherein the plaster board has an average moisture content of less than 25%.

Embodiment 20. The method of any of embodiments 13-19 wherein the plaster board has an average moisture content of less than 10%.

Embodiment 21. The method of any of embodiments 13-20 wherein the third plaster slurry line has a higher moisture content than the first plaster slurry line.

Embodiment 22. The method of any of embodiments 13-21 wherein the third plaster slurry line has foam density of at least 70 g/l.

Embodiment 23. The method of any of embodiments 13-22 wherein the third plaster slurry line has a foam density of between 80 g/l and 90 g/l.

Embodiment 24. The method of any of embodiments 13-23 wherein the third plaster slurry line includes dextrose.

Embodiment 25. The method of any of embodiments 13-24 wherein the first plaster slurry line includes dextrose.

Embodiment 26. The method of any of embodiments 13-25 further comprising applying an adhesive to the inner surface of the first panel material.

Embodiment 27. The method of any of embodiments 13-26 further comprising applying an adhesive to the inner surface of the second panel material.

Embodiment 28. The method of any of embodiments 13-27 further comprising smoothing the first plaster slurry line prior to applying the third plaster slurry line.

Embodiment 29. The method of any of embodiments 13-28, wherein the density of the first plaster slurry line is at least 120% of the density of the third plaster slurry line, e.g., at least 130%.

Embodiment 30. The method of any of embodiments 13-28, wherein the density of the first plaster slurry line is at least 140% of the density of the third plaster slurry line, e.g., at least 150%.

Embodiment 31. The method of any of embodiments 13-30, wherein the density of the first plaster slurry line is no more than 300% of the density of the third plaster slurry line, e.g., no more than 225% or no more than 200%.

Embodiment 32. The method of any of embodiments 13-28, wherein the density of the first plaster slurry line is in the range of 120%-300% of the density of the third plaster slurry line, e.g., in the range of 130%-300%, or 140%-300%, or 150%-300%, or 120%-225%, or 130%-225%, or 140%-225%, or 150%-225%, or 120%-200%, or 130%-200%, or 140%-200%, or 150%-200% of the density of the third plaster slurry line.

Embodiment 33. The method of any of embodiments 13-32, wherein the density of the second plaster slurry line is at least 120% of the density of the third plaster slurry line, e.g., at least 130%.

Embodiment 34. The method of any of embodiments 13-32, wherein the density of the second plaster slurry line is at least 140% of the density of the third plaster slurry line, e.g., at least 150%.

Embodiment 35. The method of any of embodiments 13-34, wherein the density of the second plaster slurry line is no more than 300% of the density of the third plaster slurry line, e.g., no more than 225% or no more than 200%.

Embodiment 36. The method of any of embodiments 13-32, wherein the density of the second plaster slurry line is in the range of 120%-300% of the density of the third plaster slurry line, e.g., in the range of 130%-300%, or 140%-300%, or 150%-300%, or 120%-225%, or 130%-225%, or 140%-225%, or 150%-225%, or 120%-200%, or 130%-200%, or 140%-200%, or 150%-200% of the density of the third plaster slurry line.

Embodiment 37. The plasterboard of any of embodiments 1-12, made by the process of any of embodiments 13-36.

Embodiment 38. The method of any of embodiments 13-36, wherein the plasterboard is a plasterboard according to any of embodiments 1-12.

It will be apparent to those skilled in the art that various modifications and variations can be made to the processes and devices described here without departing from the scope of the disclosure. Thus, it is intended that the present disclosure cover such modifications and variations of this invention provided they come within the scope of the appended claims and their equivalents.

What is claimed is:

1. A plaster board having
a major plane,
a first major surface and an opposing second major surface, each lying parallel to the major plane, and
a first edge extending from the first major surface to the second major surface, and a second edge extending from the first major surface to the second major surface,
the plaster board comprising:
a first panel disposed at the first major surface of the plaster board and lying parallel to the major plane, the first panel having an outer surface forming the first major surface of the plaster board, an opposing inner surface, a first edge disposed at the first edge of the plaster board, a second edge disposed at the second edge of the plaster board, and a center between the first edge and the second edge;

a second panel disposed at the second major surface of the plaster board and lying parallel to the major plane, the second panel having an outer surface forming the second major surface of the plaster board, an opposing inner surface, a first edge disposed at the first edge of the plaster board, a second edge disposed at the second edge of the plaster board, and a center between the first edge and the second edge; and a layer of hardened plaster material disposed between the first panel and the second panel, wherein the hardened plaster material comprises a first region proximate the first edge of the plaster board, the first region having a first density, and a second region proximate the center of the plaster board, the second region having a second density, the second region lying in a same plane parallel to the major plane as the first region, the first density being at least 110% of the second density.

2. The plaster board of claim 1 wherein the hardened plaster material further comprises a third region proximate the second edge of the plaster board, the third region having a third density being substantially similar to the first density, the second region being disposed between the first region and the third region along the plane parallel to the major plane.

3. The plaster board of claim 2, wherein the plaster board has a nail pull of at least 75 lbf proximate the second edge thereof.

4. The plaster board of claim 1 wherein the hardened plaster material has a density substantially equal to the second density proximate the center of the first panel, proximate the center of the second panel, and halfway between the center of the first panel and the center of the second panel.

5. The plaster board of claim 1 wherein the plaster board has a dry weight of less than 450 lb/MSF per ⅛" of thickness.

6. The plaster board of claim 1 wherein the plaster board has a nail pull of at least 75 lbf proximate the first edge thereof.

7. The plaster board of claim 1, wherein the first density is at least 130% of the second density.

8. The plaster board of claim 1, wherein the first density is no more than 200% of the second density.

9. A method of manufacturing a plaster board according to claim 2, the method comprising:

applying a first plaster slurry line to a top surface of a first panel material proximate a first edge of the first panel material;

applying a second plaster slurry line to the top surface of the first panel material proximate a second edge of the first panel material;

applying a third plaster slurry line to the top surface of the first panel material between the first plaster slurry line and the second plaster slurry line, wherein the third plaster slurry line has a lower density than the first plaster slurry line; and applying a second panel material to a top surface of third plaster slurry line, wherein the first plaster slurry line forms a portion of the layer of hardened plaster material having the first density, the second plaster slurry line forms a portion of the layer of hardened plaster material having the third density, and the third plaster slurry line forms a portion of the layer of hardened plaster material having the second density.

10. The plaster board of claim 1, wherein the first region extends from the first panel to the second panel.

11. A plaster board having
a major plane,
a first major surface and an opposing second major surface, each lying parallel to the major plane, and
a first edge extending from the first major surface to the second major surface, and a second edge extending from the first major surface to the second major surface,
the plaster board comprising:

a first panel disposed at the first major surface of the plaster board, and lying parallel to the major plane the first panel having an outer surface forming the first major surface of the plaster board, an opposing inner surface, a first edge disposed at the first edge of the plaster board, a second edge disposed at the second edge of the plaster board, and a center between the first edge and the second edge;

a second panel disposed at the second major surface of the plaster board and lying parallel to the major plane, the second panel having an outer surface forming the second major surface of the plaster board, an opposing inner surface, a first edge disposed at the first edge of the plaster board, a second edge disposed at the second edge of the plaster board, and a center between the first edge and the second edge; and a layer of hardened plaster material disposed between the first panel and the second panel, wherein the layer of hardened plaster material comprises a first region disposed proximate the first edge of the plaster board, the first region having a first density, a second region having a second density, and a third region disposed proximate the second edge of the plaster board, the third region having a third density, wherein the first density and the third density are each at least 110% of the second density, and the second region is disposed laterally between the first region and the third region along a plane parallel to the major plane.

12. The plaster board of claim 11, wherein the first density and the third density are each at least 130% of the second density.

13. The plaster board of claim 11, wherein the second portion having the second density extends from the first panel to the second panel.

14. The plaster board of claim 11 wherein the plaster board has a dry weight of less than 450 lb/MSF per ⅛" of thickness, a nail pull of at least 75 lbf proximate the first edge thereof, and a nail pull of at least 75 lbf proximate the second edge thereof.

15. The plaster board of claim 1, wherein the first region extends from the first panel to the second panel.

16. A plaster board having
a first major surface and an opposing second major surface, and
a first edge extending from the first major surface to the second major surface, and a second edge extending from the first major surface to the second major surface,
the plaster board comprising:

a first panel disposed at the first major surface of the plaster board, the first panel having an outer surface forming the first major surface of the plaster board, an opposing inner surface, a first edge disposed at the first edge of the plaster board, a second edge disposed at the second edge of the plaster board, and a center between the first edge and the second edge;

a second panel disposed at the second major surface of the plaster board, the second panel having an outer surface forming the second major surface of the plaster board, an opposing inner surface, a first edge disposed at the first edge of the plaster board, a second edge disposed at the second edge of the plaster board, and a center between the first edge and the second edge; and a layer of hardened plaster material disposed between the first panel and the second panel, wherein the hardened plaster material comprises a first region proximate the first edge of the plaster board, the first region having a first density and extending from the first panel to the second panel, and a second region proximate the center of the plaster board, the second region extending from the first panel to the second panel, the second region having a second density, the first density being at least 110% of the second density.

17. The plaster board of claim 16, wherein the first density is at least 130% of the second density.

18. The plaster board of claim 16, wherein the hardened plaster material further comprises a third region proximate the second edge of the plaster board, the third region having a density that is at least 110% of the second density, the second region being disposed between the first region and the third region along the plane parallel to the major plane.

19. The plaster board of claim 16, wherein the second region lies in a same plane parallel to the major plane as the first region.

20. The plaster board of claim 16, wherein the plaster board has a dry weight of less than 450 lb/MSF per ⅛" of thickness and a nail pull of at least 75 lbf proximate the first edge thereof.

* * * * *